United States Patent [19]
Natanne

[11] Patent Number: 5,137,137
[45] Date of Patent: Aug. 11, 1992

[54] MACHINE FOR THE AUTOMATIC PRODUCTION OF PORTIONS OF TOASTED BREAD SLICES

[75] Inventor: Antonio Natanne, Monterotondo, Italy

[73] Assignee: Fabbrica Biscotti P. Gentilini, S.R.L., Rome, Italy

[21] Appl. No.: 416,156

[22] Filed: Oct. 2, 1989

[30] Foreign Application Priority Data

Oct. 12, 1988 [JP] Japan ............................. 48446 A/88

[51] Int. Cl.⁵ ............................................. B65G 47/30
[52] U.S. Cl. .................................. 198/418.2; 198/733; 198/451
[58] Field of Search ................... 198/418.1, 418.2, 733, 198/726, 418.6, 431, 463.6, 406, 451

[56] References Cited

U.S. PATENT DOCUMENTS

| | | | |
|---|---|---|---|
| 2,722,305 | 11/1955 | McCabe | 198/726 X |
| 2,744,611 | 5/1956 | Jenney et al. | 198/418.2 |
| 3,053,373 | 9/1962 | Cross et al. | 198/733 X |
| 3,595,374 | 7/1971 | Whitfield | 198/733 X |
| 4,026,406 | 5/1977 | Gazzarini | 198/418.2 |
| 4,044,885 | 8/1977 | Rose et al. | 198/418.1 |

FOREIGN PATENT DOCUMENTS 2063831 6/1981 United Kingdom ............. 198/418.2

Primary Examiner—D. Glenn Dayoan
Attorney, Agent, or Firm—Herbert Dubno

[57] ABSTRACT

An electromechanical machine for the automatic production of portions, in any desired number, of toasted slices of bread, without human intervention includes a central body, shaped as a quarter-tronco-cone, provided with a set of guides (1) which stretch along the curved surface from the top to bottom and arrive near a horizontal metallic bay (N) which is fixed, and on which a belt conveyor moves, respectively constituted by a jointed structure (5) to which round and stiff elements (4) are fixed. The jointed structure is moved by a motor to which the structure is connected.

5 Claims, 3 Drawing Sheets

FIG.1

MACHINE FOR THE AUTOMATIC PRODUCTION OF PORTIONS OF TOASTED BREAD SLICES

FIELD OF THE INVENTION

The invention relates to an electromechanical machine able to produce toasted bread slices, in any desired number. The machine overcomes drawbacks caused by friction between one slice and another. Because of such difficulties in the past, the production of toasted bread slices required the intervention of an operator.

With the machine of the invention, the slices of toasted bread, can approach each other without jamming, falling rhythmically, one next to the other, until they reach the desired and programmed quantity and then a carrying device delivers the desired quantity of toasted bread to the packing station.

The invention thus belongs to the field of industrial electromechanical products; more precisely, to the field of processing and packaging of foodstuffs.

BACKGROUND OF THE INVENTION

The automatic packing of biscuits and of other products, which may or not be alimentary, is already known and is applicable to the packing of ready made alimentary products, including cooked products.

In the specific case of slices of toasted bread, the most important problem, as indicated above, is to prevent the slices from slipping one against the other. The inconvenience of such slipping meant that the production phase from production of the product to packing, also contained a manual phase to form the portions. This phase thus involved human intervention. Thus, the whole cycle was as follows:
1. cooking and slice preparation;
2. portioning;
3. packing.

I have found that a machine, able to make portions of toasted bread, with an uninterrupted automatic cycle is not available on the market.

OBJECTS OF THE INVENTION

It is the object of the invention to provide a machine able to make packageable portions of toasted bread which is free from the drawbacks mentioned previously.

SUMMARY OF THE INVENTION

These objects are attained, in accordance with the invention in an apparatus for producing packageable portions of a product comprised of slices, especially toast, which comprises:
  means forming a receiving surface;
  entraining means movable along the surface for entraining a packageable portion of slices therealong;
  a quarter-frustoconical array of guides, each curved from a substantially horizontal inlet segment to a vertical segment provided with an outlet, the guides being of stepped sizes so that the outlets are staggered transversely to a direction of movement of the entraining means along the surface and in the direction so that the guides can deposit respective slices upon the surface to form a packageable portion;
  a respective retractable blade disposed at each of the outlets for temporarily retaining a respective slice above the surface and retractable to deposit the respective slice on the surface; and
  a respective blocking device disposed along each of the guides above the respective blade for temporarily holding a successive slice delivered by the respective guide while the respective blade is retracted.

According to a feature of the invention each of the blocking devices comprises:
  a housing mounted laterally on a vertical segment of the respective guide;
  a casing movable in the housing;
  at least one pin projecting from the casing and adapted to project into the respective guide into a path of slices traveling along the guide;
  a spring in the casing yieldably biasing the pin into the path; and
  fluid-pressure means in the housing connected to the casing for moving the casing toward and away from the path of the respective guide.

Each of the blades can be connected with a hydraulic piston for shifting the respective blade between a retracted position permitting a slice to drop onto the surface and an extended position wherein the blade supports a respective slice above the surface.

The machine of the invention, providing improvements in the production and packaging of toasted bread, gives the following advantages:
  a saving of labor;
  a production increase, as the cycle becomes shorter; and
  an improvement of the hygienic conditions.

It is important to note that the production can increase without limit. It depends only on the number of machines according to the invention held by the producer, without the necessity of increasing the number of operators.

The portioning machine of the present invention is best used by alimentary manufacturers and/or firms producing toasted bread slices to be packed in packages or boxes. The portioning machine can, of course, be used, for all products, alimentary or not, for which a portioning operation is desired.

The assignee of the present patent application uses this machine at the output of the oven from which the slices of toasted bread exit and are channeled in special guides, so that, passing through the automatic portioning stage, they finish the cycle with the packaging phase.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
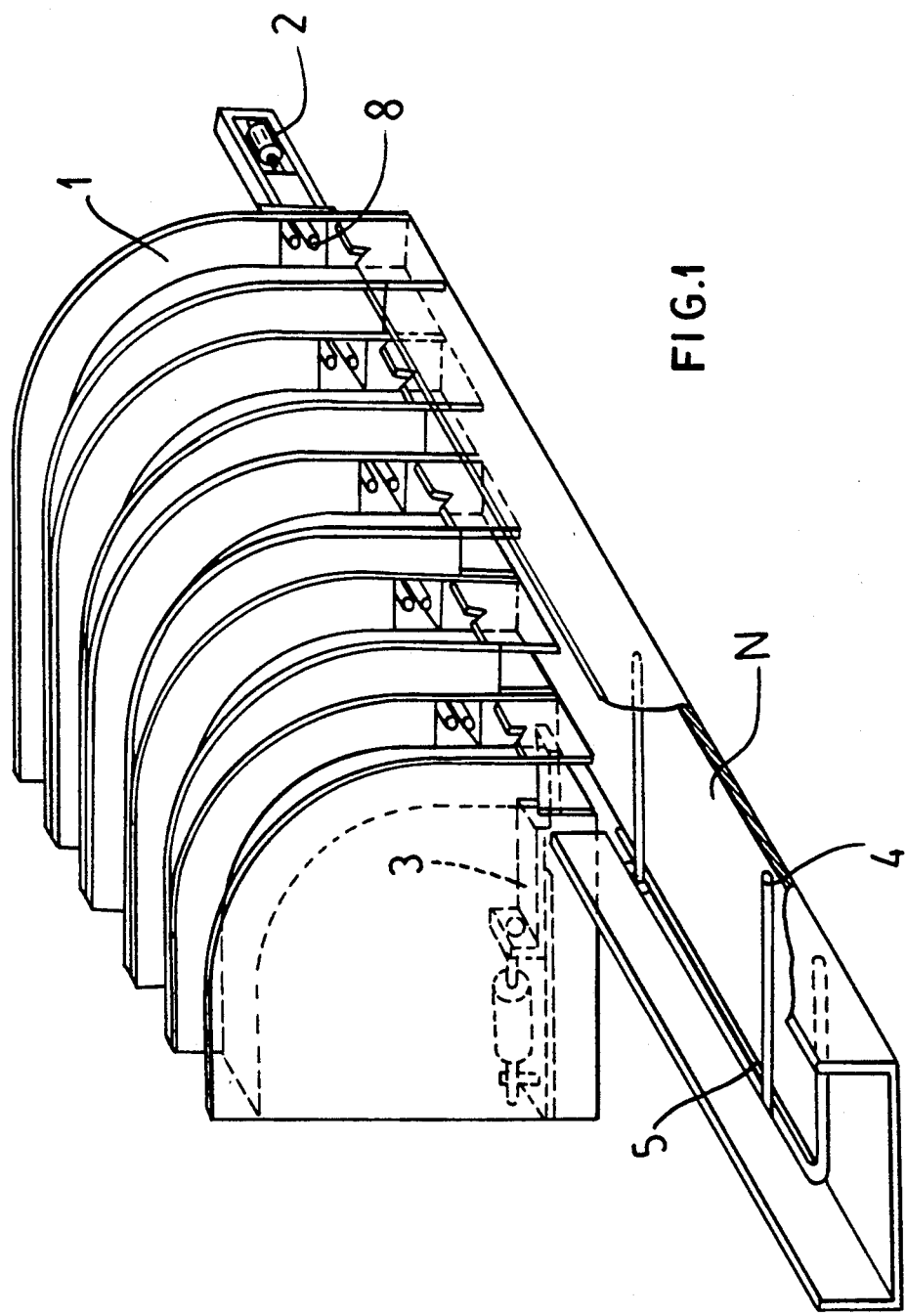
FIG. 1 is a perspective view, partly broken away of the portioning machine of the invention.

The portioning machine of FIG. 1 comprises a guide 1, a block device 2, a shovel blade, or portion shifter 3, and a transporting element 4 connected to a chain 5.

Figure 2:
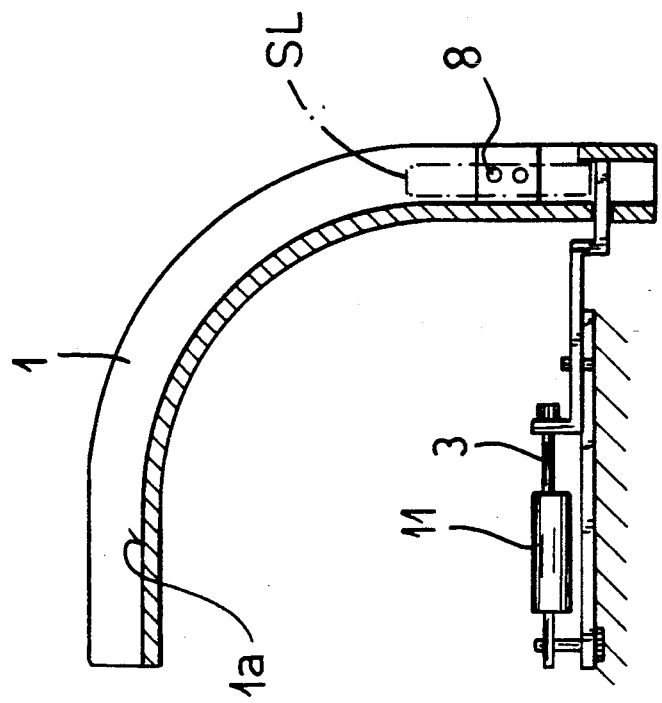
FIG. 2 is a vertical cross sectional view through one of the guides of the apparatus.

The "guide-shovel-block" assembly including this portion shifter blade 5 is shown in FIG. 2.

Figure 3:
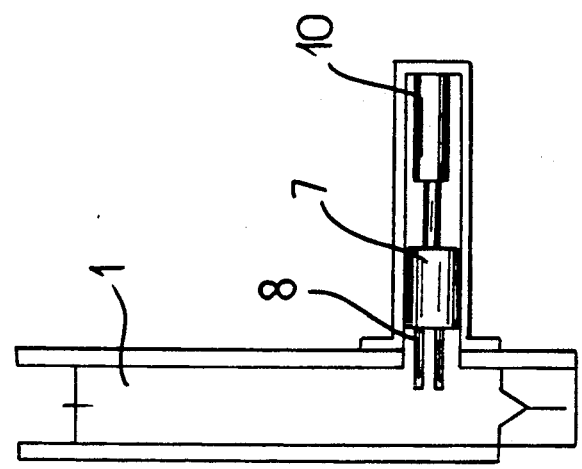
FIG. 3 is a view of a vertical segment of this guide in elevation.
Figure 4A:
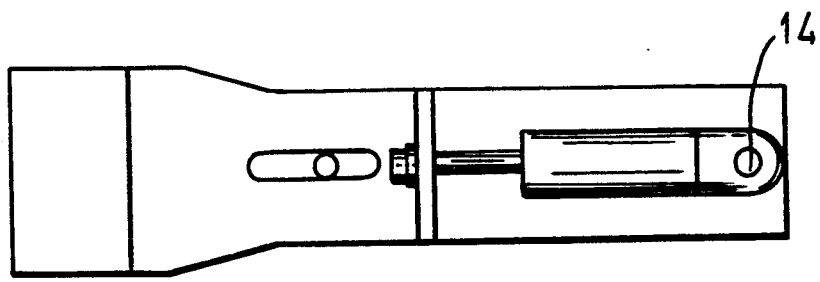
FIG. 4A is a plan view of the blade assembly.
Figure 4B:
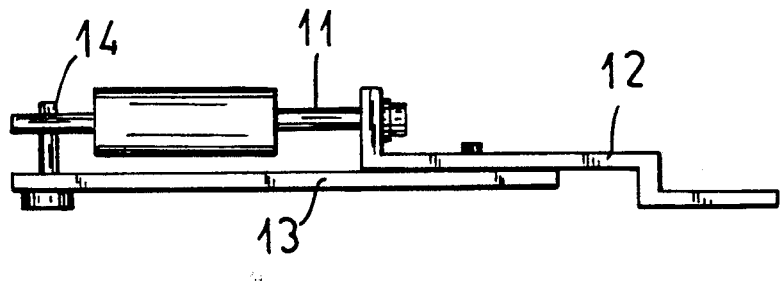
FIG. 4B is a side view of the blade assembly.

FIG. 3 illustrates the guide-block assembly in front view. FIG. 4A and 4B show the shovel 3 of FIG. 1 in greater detail. The shovel or portion shifter blade 3 can comprise a pneumatic piston 11 displacing a flat part 12 of the shovel blade 3 relative to a support 13 to which the cylinder of the piston is attached by a screw 14.

Figure 5:
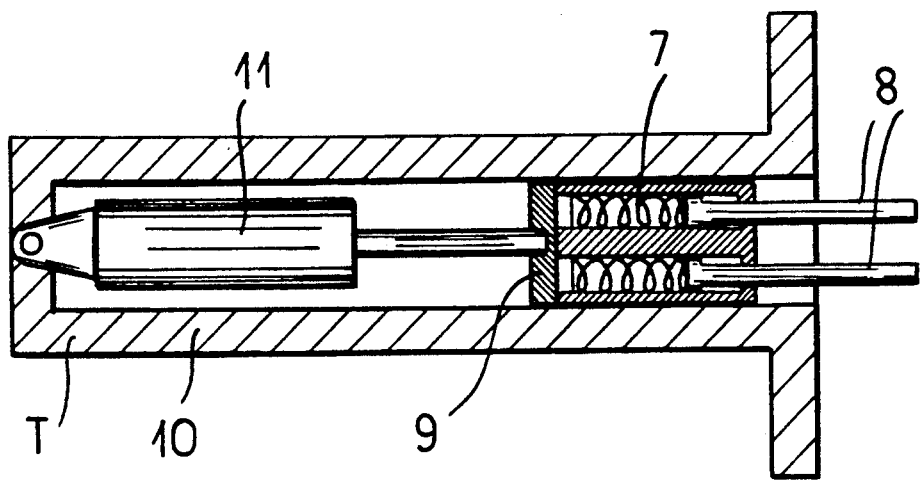
FIG. 5 is a cross sectional view through a blocking device according to the invention.

FIG. 5 shows the element which blocks the slice (indicated by 2 in FIG. 1) where springs 7 bear upon testers 8 in a housing T containing a shock-absorber 9 acted upon by a cylinder 10.

To make the invention easier to understand, I will describe the path followed by the slice of bread from portioning to packing.

The first slice SL, coming from the oven floor, is pushed by an existing system not of importance to the invention, into guide 1, following the curved rail 12 and arriving vertically onto the shovel 3 controlled by the pneumatic piston 11, which moves back far enough to make the bread slice fall onto the fixed plate N. Simultaneously with the movement of the shovel 3 of the first slice, the second slice, of the same guide, which in the meantime followed the first one, is blocked by the two controllers moved by a pneumatic piston 8 whose movement finishes at the side of the slice, entering into contact with a shock absorber. At the same time, the slice is transported by an entraining device 4, connected to the moving chains.

The "entraining device" is a round device of metal or some other similar material end-connected to the adjoining chain 5, in turn connected to an electric motor easily found on the market.

One slice, followed by other slices in the number required by the program for a complete package, pushed by the trailing element, finishes its path, together with the others, on the fixed plane where the package is made while the entraining element 4, after leaving the slice on the packing plane, follows a U curve and carries on with its return travel, to begin another cycle.

The machine, which is able to make portions automatically, has a quarter-frustoconical configuration, so that the first guide is bigger than the second, the second bigger than the third, and so on.

The distance between one guide and the next is the same as the thickness of a slice, with enough tolerance to permit the slice to pass comfortably, on one side, entrained by the entraining element 4, just as the shovel 3 drops the slice.

The portioning machine can be actuated by an electric motor, which rotates a shaft provided with cams, provided with fins acting as a time.

The entraining system can include elements 4 connected to the same trailing chain 5. Detailed elements which constitute the invention presented and the working process have been described.

But is must be said that this description relates to the actuation and application actually preferred by the inventor.

In fact is possible to manufacture the machine with different materials, either partly or completely, for instance with different metals or in plastic or from any other suitable material.

The operation relating to the controller and to all parts of the machine can be effected rhythmically by an electronic system. If possible is electromechanical or electronicomechanical, it is possible for a single operator to work with many of these machines.

I claim:

1. An apparatus for producing packageable portions of a product comprises of slices, said apparatus comprising:

means forming a receiving surface;

entraining means movable along said surface for entraining a packageable portion of slices therealong;

a quarter-frustoconical array of guides, each curved from a substantially horizontal inlet segment to a vertical segment provided with an outlet, said guides being of stepped sizes so that said outlets are staggered transversely to a direction of movement of said entraining means along said surface and in said direction so that said guides can deposit respective slices upon said surface to form a packageable portion;

a respective retractable blade disposed at each of said outlets for temporarily retaining a respective slice above said surface and retractable to deposit the respective slice on the surface; and a respective blocking device disposed along each of said guides above the respective blade for temporarily holding a successive slice delivered by the respective guide while the respective blade is retracted, each of said blocking devices comprising:

a housing mounted laterally on a vertical segment on the respective guide, a casing movable in said housing, at least one pin projecting from said casing and adapted to project into the respective guide into a path of slices traveling along said guide, a spring in said casing yieldably biasing said pin into said path, and fluid-pressure means in said housing connected to said casing for moving said casing toward and away from the path of the respective guide.

2. The apparatus defined in claim 1 wherein each of said blades is connected with a hydraulic piston for shifting the respective blade between a retracted position permitting a slice to drop onto said surface and an extended position wherein said blade supports a respective slice above said surface.

3. The apparatus defined in claim 2 wherein said entraining means includes a chain and a plurality of entraining elements connected at one end to said chain and extending across said surface.

4. The apparatus defined in claim 1, wherein each of said blades is connected with a hydraulic piston for shifting the respective blade between a retracted position permitting a slice to drop onto said surface and an extended position wherein said blade supports a respective slice above said surface.

5. The apparatus defined in claim 1 wherein said entraining means includes a chain and a plurality of entraining elements connected at one end to said chain and extending across said surface.

* * * * *